United States Patent [19]

Bonnet et al.

[11] 4,347,497
[45] Aug. 31, 1982

[54] A.C. OPERATED SIGNALLING DEVICE FOR MOPEDS

[75] Inventors: Marc Bonnet, Valentigney; Daniel Borde, Beaulieu-Mandeure, both of France

[73] Assignee: Cycles Peugeot, Valentigney, France

[21] Appl. No.: 919,517

[22] Filed: Jun. 27, 1978

[30] Foreign Application Priority Data

Jun. 29, 1977 [FR] France .............................. 77 19943

[51] Int. Cl.³ ...................... B60Q 1/34; G08B 21/00
[52] U.S. Cl. .................................. 340/73; 340/81 R; 340/641; 340/134; 315/200 A; 315/209 R; 307/10 LS
[58] Field of Search ................. 340/73, 81 R, 72, 74, 340/81 F, 83, 331, 642, 641, 635, 134; 315/200 A, 206, 362, 314, 315, 312, 322, 219, 217, 225, 209 R; 180/82 R; 307/102 S, 17, 38, 41, 132 R

[56] References Cited

U.S. PATENT DOCUMENTS

| | | | |
|---|---|---|---|
| 2,933,650 | 4/1960 | Tyrwhitt et al. | 315/322 |
| 3,184,637 | 5/1965 | Skinner | 340/642 |
| 3,240,992 | 3/1966 | Hallay | 315/322 |
| 3,283,206 | 11/1966 | Uttetel | 315/322 |
| 3,390,304 | 6/1968 | Scott et al. | 340/83 |
| 3,440,489 | 4/1969 | Davidson et al. | 340/83 |
| 3,631,392 | 12/1971 | Zelina | 340/331 |
| 3,894,281 | 7/1975 | Bloomfield | 315/88 |

Primary Examiner—John W. Caldwell, Sr.
Assistant Examiner—Donnie L. Crosland
Attorney, Agent, or Firm—Sughrue, Mion, Zinn, Macpeak and Seas

[57] ABSTRACT

The installation includes a main load supplied with power by an a.c. source such as a magnetic flywheel of a moped and a current detector connected in series in the supply circuit of the main load. This detector provides, as a function of the current detected for, the automatic supply of power to a system for monitoring the operation of the main load or of a secondary load also supplied with power by the source.

7 Claims, 5 Drawing Figures

A.C. OPERATED SIGNALLING DEVICE FOR MOPEDS

The present invention relates to electric installations for two-wheeled vehicles and more particularly to installations supplied with current from an a.c. source, such as magnetic flywheel.

Electric installations for two-wheeled vehicles, such as Mopeds or the like, are known in which the loads of the installation such as the headlamps, the parking lights, the direction indicator lights and other lights are directly connected to the magnetic flywheel so that changes in voltage to which the flywheel is subject are transmitted to the loads.

The disturbances thus produced have a disadvantageous effect on the operation of the loads the weakest of which deteriorate frequently and need to be replaced periodically.

An object of the invention is to overcome the aforementioned drawbacks and to provide an electric installation which, although it is supplied with current by a magnetic flywheel, ensures a correct operation of the various loads and ensures their protection against operational anomalies of the magnetic flywheel.

According to the invention, there is provided an electric installation supplied with power by an a.c. source, in particular a magnetic flywheel of a motor, comprising a main load supplied with power by said source, wherein there is also provided a current detector connected in series in the supply circuit of said main load and adapted to ensure, in accordance with the current detected, the automatic supply of power to a system for monitoring the operation of said main load or of a secondary load which is also supplied with power by said source.

According to a particular feature of the invention, the current detector is formed by a current transformer the primary winding of which is connected in series with the main load and the secondary winding of which supplies power to the system for monitoring the operation of said main load or of said secondary load.

Further features of the invention will be apparent from the ensuing description.

In the accompanying drawings given merely by way of example:

Figure 1:
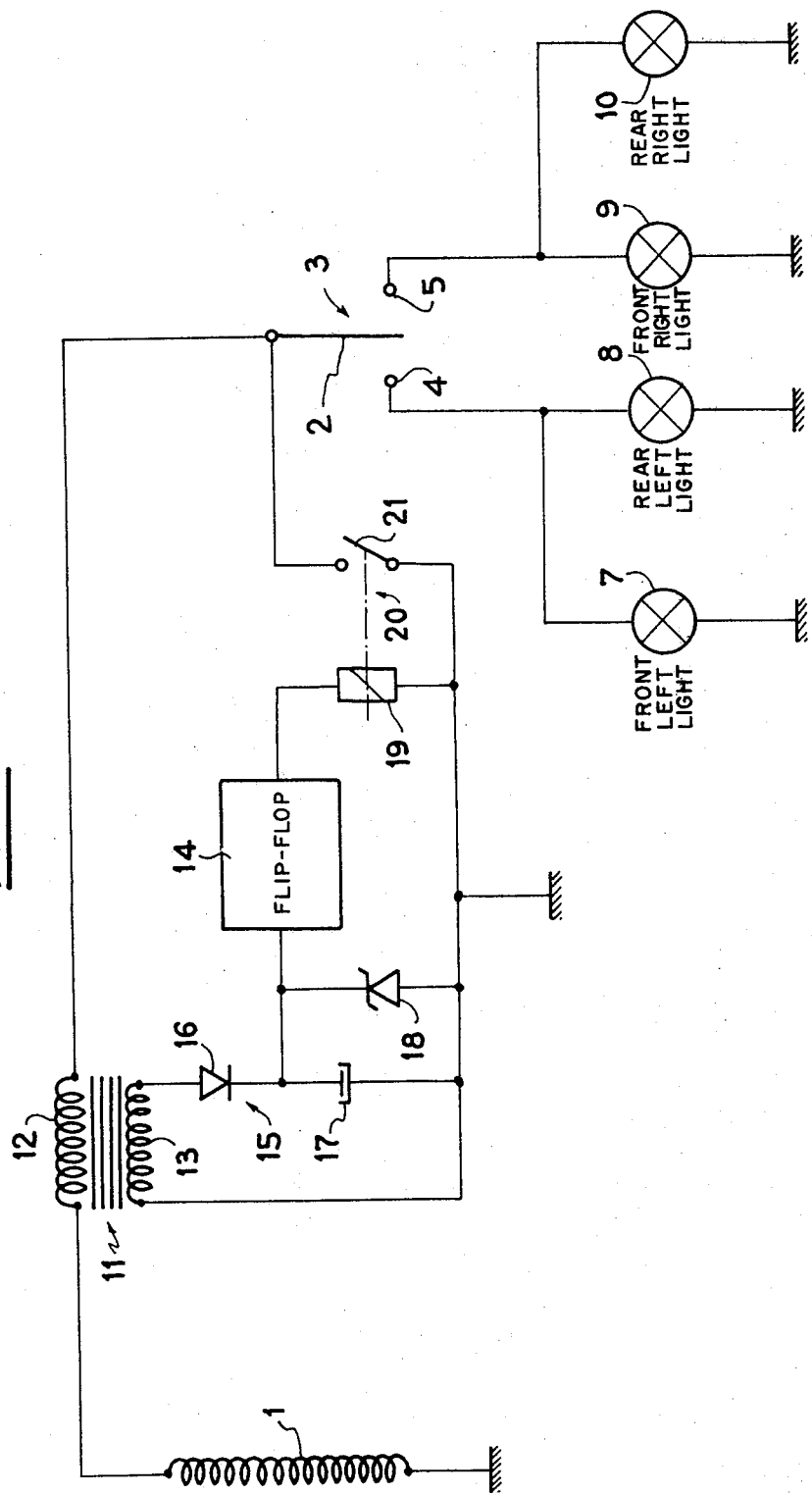
FIG. 1 is a diagrammatic view of a first embodiment of a flasher unit according to the invention.

The flasher unit shown in FIG. 1 comprises an a.c. source 1 represented by the inductor of a magnetic flywheel (not shown) of, for example, a Moped or motorized bicycle. The source 1 is connected to a moving contact 2 of a switch 3 of a direction changing indicator which also comprises fixed contacts 4 and 5 with which are respectively connected in parallel to the front and rear left indicator lights 7 and 8 and the front and rear right indicator lights 9 and 10. Connected between the source 1 and the direction changing indicator switch 3 is a transformer 11 whose primary winding 12 is connected in series with the source 1 and the switch 3. The secondary winding 13 of the transformer 11 constitutes the supply element of a flip-flop 14 to the input of which is connected through a rectifier network 15 comprising a diode 16 and a filter capacitor 17 connected between the cathode of the diode 16 and earth, the junction point of the diode 16 and the capacitor 17 being connected to the input of the flip-flop 14. A Zener diode 18 is connected in parallel with the capacitor 17. The output of the flip-flop 14 is connected to the coil 19 of a relay 20 controlling a switch 21 for short-circuiting the direction changing indicator lights 7 to 10.

The circuit just described operates in the following manner:

When the direction changing indicator switch 3 is placed on the left fixed contact 4 or on the right fixed contact 5, the alternating current generated by the generator 1 which supplies power to the lights 7,8 or 9,10 passes through the primary winding 12 of the transformer 11. This produces in the secondary winding 13 of the transformer a voltage supplying power to the flip-flop 14 through the rectifier network 15. The d.c. voltage is stabilized by the Zener diode 18 so as to ensure a regular operation of the flip-flop 14 irrespective of the current in the winding 12 of the transformer 11.

When the flip-flop 14 changes state, the relay 20 is supplied with current and its coil 19 causes the closure of the switch 21 so that the direction changing indicator lights are temporarily short-circuited owing to the direct earthing of the moving contact 2 of the direction changing indicator. Consequently, the lights which were lit up are extinguished. A short-circuit current still flows in the winding 12 of the transformer 11 and this permits maintaining the supply of current to the flip-flop 14. When the flip-flop returns to its initial state the current in the coil 19 is cut off and the switch 21 is opened so that the direction changing indicator lights are again supplied with current through the primary winding 12 of the transformer 11 and light up. In the course of the following period of the flip-flop 14 the cycle recommences.

The fact of returning the switch 3 to its position of rest, stops the circulation of the current produced by the source 1 in the winding 12 of the transformer 11. Consequently, the flip-flop 14 is no longer supplied with current so that the flasher unit automatically stops operating.

This also occurs if, with the switch 3 placed in the right or left position, the corresponding lights 7, 8 or 9,10 are accidentally disconnected or burnt out.

Figure 2:
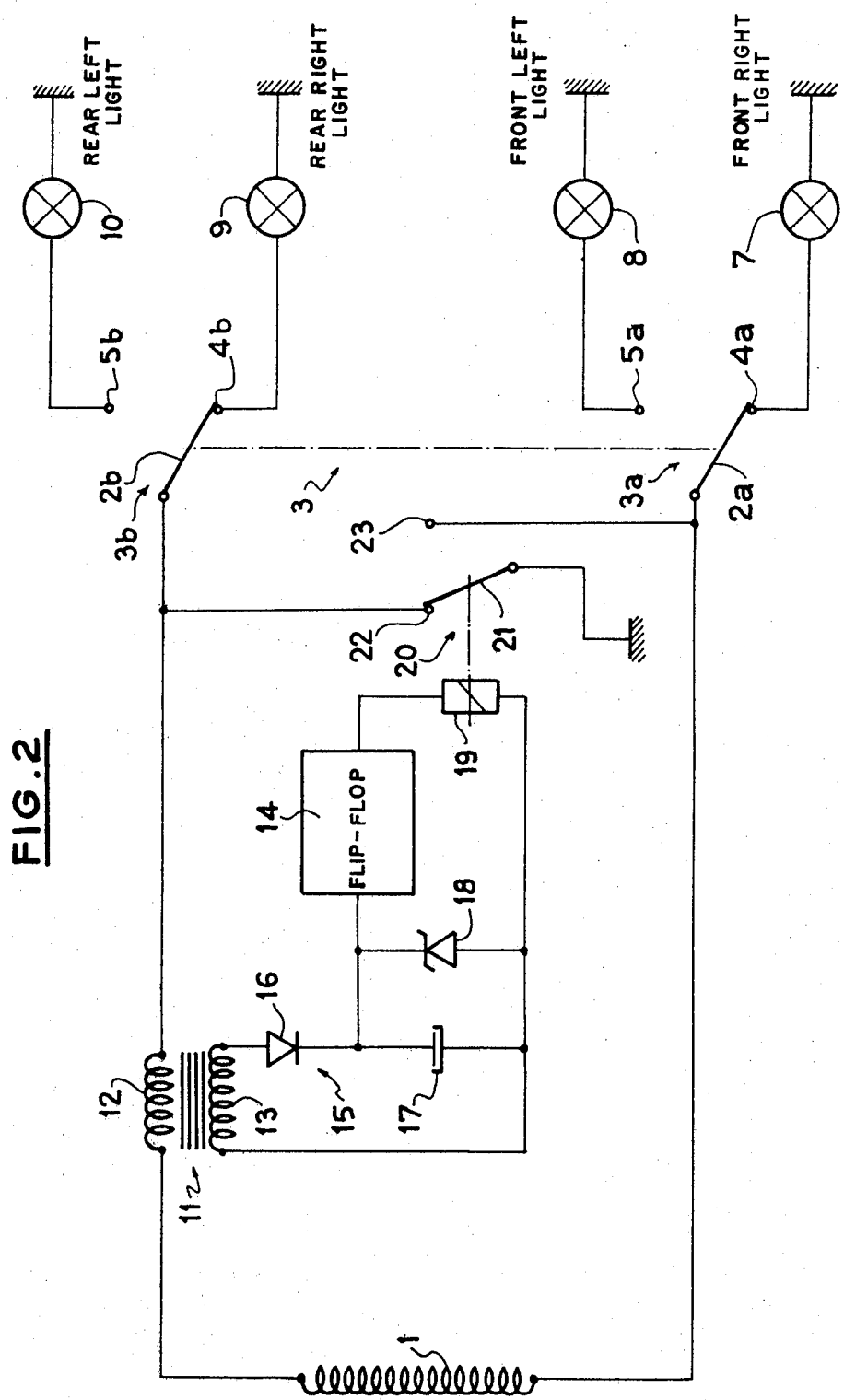
FIG. 2 is a diagrammatic view of a second embodiment of a flasher unit according to the invention.

The unit shown in FIG. 2 differs from that shown in FIG. 1 only in the design of the direction changing indicator switch. The component parts of this unit which are identical to those of FIG. 1 are designated by the same reference numerals.

The direction changing indicator switch 3 of the unit shown in FIG. 2 comprises two switches $3^a$ and $3^b$ which are mechanically interconnected and have moving contacts $2^a$ and $2^b$ which are respectively connected to the two terminals of the a.c. source 1. Each switch $3^a$ and $3^b$ comprises two fixed contacts $4^a$ and $5^a$, $4^b$ and $5^b$ respectively. The contacts $4^a$ and $4^b$ are respectively connected to the rear and front right indicator lights 7 and 9 and the contacts $5^a$ and $5^b$ are connected to the rear and front left indicator lights 8 and 10.

As concerns the rest of the circuit, it is similar to that of FIG. 1 except that the switch 21 of the relay 20 is replaced in FIG. 2 by a switch whose moving contact is moved between two fixed contacts 22 and 23 which are respectively connected to the moving contacts of the switches $3^a$ and $3^b$.

When the switch 3 is placed in the right position for example, the moving contacts $3^a$ and $3^b$ thereof are respectively placed on the fixed contacts $4^a$ and $4^b$ so that the lights 7 and 9 are put in circuit. Operation of the flip-flop 14 shifts the moving contact 21 of the switch 20 alternately to the fixed contacts 22 and 23 which supplies current to the lights 9 and 7 respectively in turn.

Figure 3:
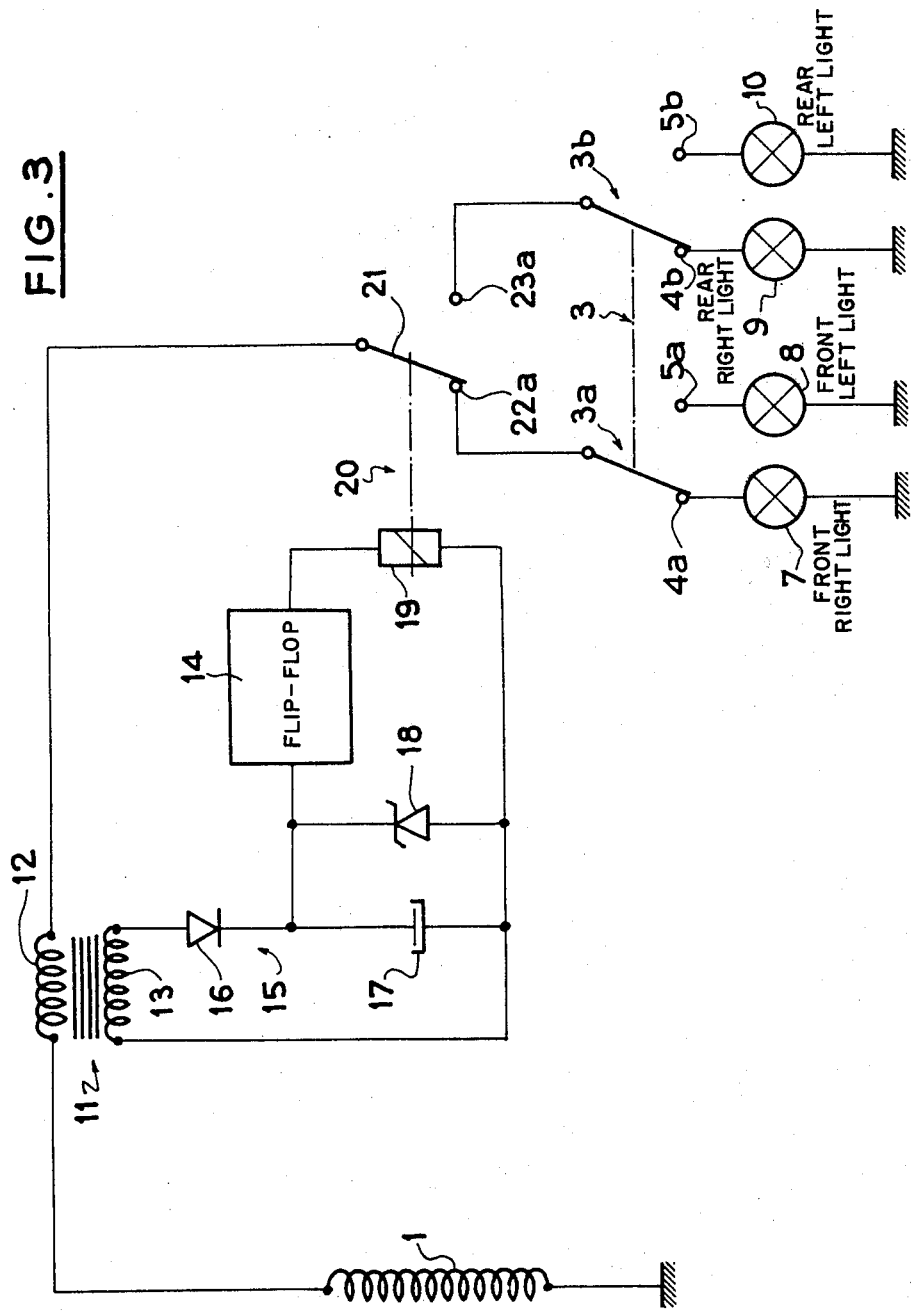
FIG. 3 is a diagrammatic view of a third embodiment of a flasher unit according to the invention.

In the embodiment shown in FIG. 3, the direction changing indicator switch 3 also consists of two switches $3^a$ and $3^b$ which are mechanically interconnected. As in the embodiment shown in FIG. 3, the fixed contacts $4^a$ and $5^a$ and $4^b$ and $5^b$ of the switches $3^a$ and $3^b$ are respectively connected to the lights 7 to 10. The circuit shown in FIG. 3 differs from that shown in FIG. 2 essentially in that the switch 21 actuated by the relay 20 is connected in series with the primary winding 12 of the transformer 11. The switch 21 comprises two fixed contacts $22^a$ and $23^b$ respectively connected to the switches $3^a$ and $3^b$. The unit shown in FIG. 3 operates in a similar manner to the unit shown in FIG. 2.

In the illustrated embodiments, the power relay 20 is an electromechanical relay. However, this relay may be replaced by a static switch such as a triac, a thyristor or the like.

When the source 1 cannot be short-circuited without damage, the power switch may be put in the main circuit in series with the primary winding 12 of the transformer 11. In this case, in order to maintain the supply of current to the flip-flop 14 during the opening stage of said switch, a capacitor 17 of suitable value must be employed.

The flasher units just described have the following advantages:

When the power circuit is switched in, that is to say when the user operates the flasher unit, the utilization current passes through the primary winding of the transformer while it produces only a very small voltage drop in the latter and the unit is automatically supplied with current. If some of the lights 7 to 10 are damaged, current no longer circulates in the primary circuit of the transformer and the unit stops operating without any damage.

In fact, the transformer 11 has several functions.

It automatically supplies current to the units when the user operates the flasher lights.

It takes only a very small amount of power from the utilization circuit.

It detects the presence of a current in the utilization circuit and thereby prevents the accidental and dangerous operation of the unit when the indicator lights are burnt out or disconnected.

It ensures a galvanic insulation of the unit relative to the power generator so that it is protected against any false actuation or defective operation of the utilization circuit.

Reference will again be made to FIG. 2 in order to examine a feature of the operation of the unit according to the invention.

When the switch 3 is placed for example on the right contacts $4^a$, $4^b$ and, assuming that the rear right light 7 is burnt out, no current flows in the circuit 1-12-21-$2^a$-7. As the primary winding 12 of the transformer is not in circuit, the unit does not operate. The moving contact 21 of the relay remains in its position of rest and the front right light 9 cannot light up. In this way, the user realizes that his rear right light is defective.

Now, if the front light is burnt out, at the start, the rear light 7 lights up. The unit is then supplied with current. The contact of the relay 21 changes position, but the front light 9 cannot light up so that the user is immediately made aware of this fact. The contact of the relay 21 returns to its position of rest and the rear light again lights up.

In such a case, apart from the detection of defects, the arrangement of the invention performs a safety function for the user owing to the fact that the rear light 7 operates normally as a flasher light.

The same operation or procedure for detecting defects is applicable to the arrangement shown in FIG. 3.

Figure 4:
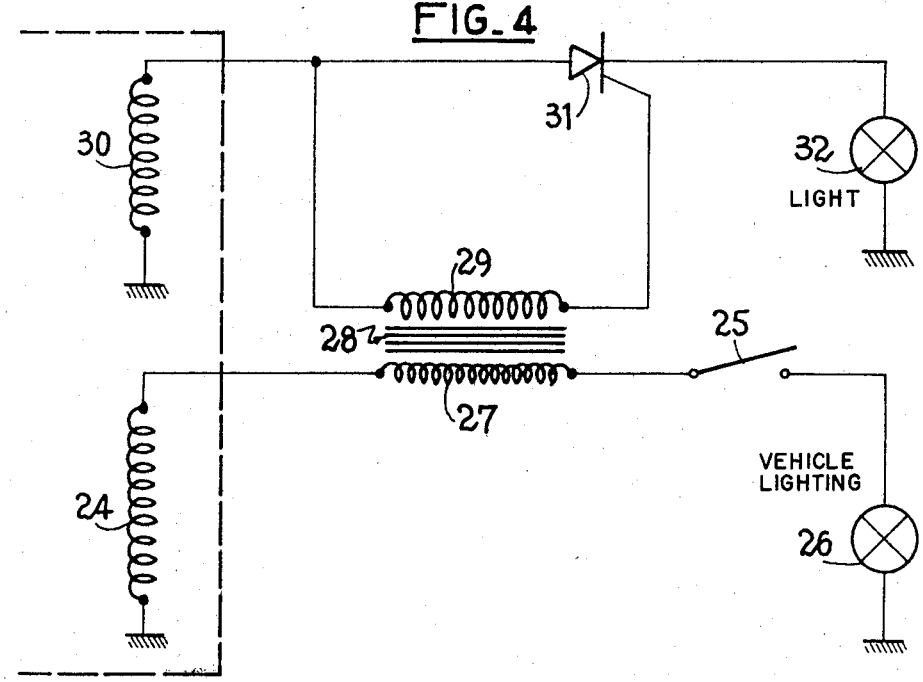
FIG. 4 is a diagrammatic view of an automatic lamp lighting circuit.

The circuit shown in FIG. 4 comprises, similar to the foregoing circuits, an a.c. source 24 constituted by an inductor of a magnetic flywheel, connected through a switch 25 to a load 26 constituted by a light.

Between the source 24 and the switch 25 is connected the primary winding 27 of a current transformer 28 which performs the function of a current detector in the supply circuit of the load 26.

The secondary winding 29 of the transformer 28 is connected to another inductor 30 of the magnetic flywheel and furthermore to the control electrode of a switching means 31 such as, for example, a controlled rectifier, the anode-cathode path of which is connected between said other inductor 30 and a secondary load 31.

When the user closes the switch 25, the primary winding 27 of the transformer 28, which may be formed in the presently-described embodiment by a simple bar of magnetic material around which on the order of 10 to 20 turns of wire are wound, is traversed by the supply current of the load 26.

A voltage is obtained at the terminal of the secondary winding 29 which renders the switch 31 conductive so that the load 32 is supplied with current by the inductor 30.

If in the course of operation the load 26 is accidentally disconnected or damaged, the transformer 28 no longer delivers the control voltage for the operation of the switch 31 and the load 32 is no longer supplied with current by the inductor 30. However, this load undergoes no damage. Inversely, if the load 32 is accidentally damaged, the operation of the primary load 26 is not affected thereby.

Figure 5:
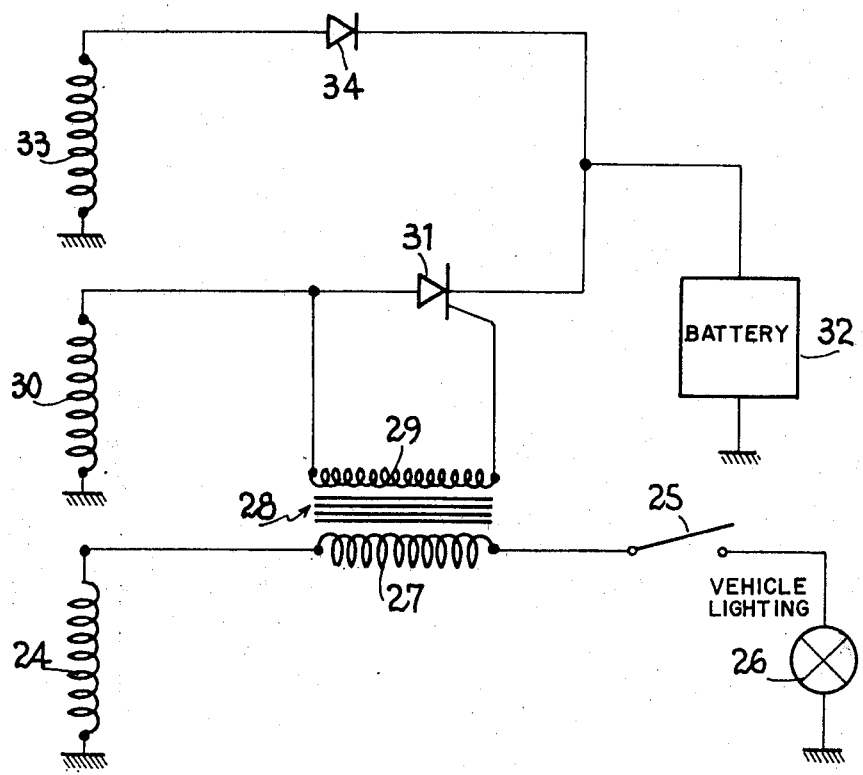
FIG. 5 is a diagrammatic view of a circuit for automatically reinforcing the current for charging a battery when the vehicle lighting circuit is in use.

The circuit shown in FIG. 5 is similar to that shown in FIG. 4 and differs from the latter only in that the load 32 is constituted by an accumulator battery.

Moreover, this circuit comprises a branch circuit for the direct supply of current to the battery 32 by an additional inductor 33 of the a.c. source through a rectifier 34.

In the presently-described embodiment, the main load 26 constitutes the lighting of the vehicle.

When the switch 25 is open, the lighting 26 not being supplied with current, the battery 32 is charged solely by the inductor 33 through the rectifier 34.

When the lighting 26 is put in circuit by the closure of the switch 25, the current flowing through the primary winding 27 of the transformer 28 generates in its secondary winding 29 a voltage which triggers the controlled rectifier and the latter is rendered conductive.

The current from the inductor 30 then reinforces the charging current for the battery 32 produced by the inductor 33. If the light 26 is accidentally disconnected or damaged, the controlled rectifier 31 is blocked and the inductor 30 no longer delivers a reinforced charging current to the battery 32.

In the embodiment shown in FIGS. 4 and 5, a controlled rectifier is used as a triggerable switch but it will be understood that a switch of some other kind may be used, such as a triac, thyristor or a relay.

Having now described my invention what I claim as new and desire to secure by Letters Patent is:

1. An electric installation supplied with power by an a.c. source such as a magnetic flywheel of a Moped, comprising at least a main load, a circuit connecting the main load to said source, a monitoring system connected to monitor operation of said main load, a current detector connected in series in said circuit and capable of ensuring, as a function of the current detected, an automatic supply of power to the monitoring system by inductive coupling from said current detector to said monitoring system, said monitoring system being connected to be operatively responsive to said current detector, said monitoring system including means for intermittently controlling the supply of power to the main load, said monitoring system being powered exclusively by the power supplied to the monitoring system from said current detector.

2. An installation as claimed in claim 1, wherein said current detector comprises a current transformer comprising a primary winding connected in series with said main load and a secondary winding connected to supply power to the monitoring system.

3. An installation as claimed in claim 1, comprising means for automatically supplying power to said monitoring system for monitoring the main load to be controlled thereby when the main load is in use and means for galvanically insulating the monitoring system against accidents which could occur in the circuit of the main load.

4. An installation as claimed in claim 2, wherein said main load comprises direction changing lights of a flasher unit connected to the primary winding of said transformer, a direction changing indicator switch is associated with the direction changing lights, the secondary winding of said transformer being part of a stabilized supply for said means for controlling the intermittent supply.

5. An installation as claimed in claim 4, wherein said means for controlling the intermittent supply comprise a flip-flop having an output, and relay means connected to said output for intermittently putting said indicator lights in short circuit, depending on the position of the direction changing indicator switch.

6. An installation as claimed in claim 5, wherein the direction changing indicator switch comprises two switches, means mechanically interconnecting said two switches, the two switches each having a moving contact which is connected to the a.c. source, each of said two switches further comprising two fixed contacts respectively connected to the corresponding indicator lights, said relay means including a switch connected to the a.c. source for alternately supplying power to two of said lights according to the position of said direction changing indicator switch.

7. A direction indicator arrangement including:
lighting means for indicating direction;
an a.c. power source;
means connecting the source to the lighting means;
a switching means for causing the power from the source to be applied to the lighting means in an intermittent fashion; and
means for powering said switching means in an intermittent fashion, said powering means being inductively coupled to said connecting means and operatively responsive to the current supplied by the power source to the lighting means, the power for the powering means being supplied exclusively through the inductive coupling with the connecting means;
the switching means being connected between the powering means and the connecting means.

* * * * *